(12) United States Patent
Kawashima

(10) Patent No.: US 6,274,213 B1
(45) Date of Patent: Aug. 14, 2001

(54) DOUBLE-FACED PRESSURE-SENSITIVE ADHESIVE TAPES

(75) Inventor: Tadasu Kawashima, Tochigi (JP)

(73) Assignee: Sony Chemicals Corp., Tokyo (JP)

( * ) Notice: Subject to any disclaimer, the term of this patent is extended or adjusted under 35 U.S.C. 154(b) by 0 days.

(21) Appl. No.: 09/338,499

(22) Filed: Jun. 23, 1999

(30) Foreign Application Priority Data

Jun. 29, 1998 (JP) .................................................. 10-181294

(51) Int. Cl.$^7$ ...................................................... B32B 7/12
(52) U.S. Cl. ...................... 428/40.1; 428/41.5; 428/41.9; 428/42.1; 428/214; 428/353; 428/354; 428/356; 428/480; 428/906
(58) Field of Search .................. 428/40.1, 41.9, 428/41.5, 42.1, 214, 343, 354, 353, 906, 356, 480

(56) References Cited

U.S. PATENT DOCUMENTS 2,532,011 * 11/1950 Dahlquist ............................ 428/40.1
5,766,748 * 6/1998 Ikada .................................... 428/220
5,798,159 * 8/1998 Callahan .............................. 428/41.9

\* cited by examiner

*Primary Examiner*—Nasser Ahmad
(74) *Attorney, Agent, or Firm*—Oliff & Berridge, PLC

(57) ABSTRACT

A double-faced adhesive tape without release liner is provided.

A weakly adhesive layer 12 having a relatively weak adhesive force is formed on one face of a resin film 11 and a strongly adhesive layer 13 having a stronger adhesive force than that of the weakly adhesive layer 12 is formed on the other face and the assembly is formed into a roll of a double-faced adhesive tape 5. The weakly adhesive layer 12 is formed after the surface of the resin film 11 has been subjected to a rubbing treatment to increase the adhesive force between them, so that the weakly adhesive layer 12 and the strongly adhesive layer 13 are separated without using a release liner when the tape is rolled up.

12 Claims, 2 Drawing Sheets

DOUBLE-FACED PRESSURE-SENSITIVE ADHESIVE TAPES

FIELD OF THE INVENTION

The present invention relates to the technical field of adhesive tapes, particularly to adhesive tapes without release liner.

PRIOR ART

Double-faced adhesive tapes have previously been used in various fields such as domestic and constructional applications. Reference 105 in FIG. 5 represents a prior art double-faced adhesive tape comprising adhesive layers 112 and 113 formed on upper and lower faces of a resin film 111, respectively.

The adhesive layers 112, 113 are formed in a given thickness by applying and drying an adhesive containing an elastomer such as an isoprene rubber or styrene-butadiene rubber, or a crosslinking acrylic adhesive, a crosslinking silicone adhesive or the like with various additives.

When this adhesive tape 105 is formed into a roll as shown by 110 in FIG. 4, a release liner 114 is applied on the upper adhesive layer 112 to allow the tape to be readily unwound without direct contact between the upper adhesive layer 112 and the lower adhesive layer 113 as shown in FIG. 5, which otherwise would be difficult to separate from each other.

During the use of a roll of the double-faced tape 110, the lower adhesive layer 113 on the outermost ply of the adhesive tape 105₁ may be separated from the release liner 114 on the underlying ply of the adhesive tape 105₂.

However, the double-faced adhesive tape 105 as described above requires that two adhrends should be bonded by provisionally bonding the lower adhesive layer 113 to one adherend, then stripping off the release liner 114 and bonding the other adherend to the exposed adhesive layer 112. The release liner 114 is not only cumbersome to strip off but also waste.

An object of the present invention is to provide a double-faced adhesive tape without release liner in order to overcome the above disadvantages of the prior art.

DISCLOSURE OF THE INVENTION

In order to solve the above problems, the present invention provides a double-faced adhesive tape comprising a weakly adhesive layer having a relatively weak adhesive force formed on a surface of a resin film and a strongly adhesive layer having a stronger adhesive force than that of said weakly adhesive layer formed on the opposite surface of said resin film, wherein said weakly adhesive layer is formed on the surface of said resin film having been subjected to a rubbing treatment.

In the double-faced adhesive tape of the present invention, said resin film may consist of a polylactic resin film.

In the double-faced adhesive tape of the present invention, said weakly adhesive layer may be based on a polyisoprene rubber.

The double-faced adhesive tape of the present invention may be in the form of a stack of plies with said weakly adhesive layer and said strongly adhesive layer being in direct contact with each other.

The stack of plies may advantageously be in the form of a roll.

In the double-faced adhesive tape of the present invention characterized as above, the weakly adhesive layer having a relatively weak adhesive force is formed on a surface of the resin film and the strongly adhesive layer having a stronger adhesive force than that of the weakly adhesive layer is formed on the opposite surface of the resin film.

In the double-faced adhesive tape, the weakly adhesive layer is formed on the surface of the resin film after having been subjected to a rubbing treatment. Thus, the adhesive force between the weakly adhesive layer and the resin film is increased so that it becomes stronger than the adhesive force between the weakly adhesive layer and the strongly adhesive layer. Therefore, the double-faced adhesive tape may be formed into a stack of plies with the weakly adhesive layer and the strongly adhesive layer being in direct contact with each other without using a release liner. The stack of plies may be in the form of a roll of a single double-faced adhesive tape.

Polylactic resin films are well-suitable for said resin film because they greatly increase their adhesive force against adhesives once their surface has been subjected to a rubbing treatment, though any resin films that increase their adhesive force by a rubbing treatment may be used in the present invention.

The polyisoprene rubber from which said weakly adhesive layer is formed may be either natural or synthetic. The rubber used for the weakly adhesive layer is not limited to polyisoprene rubbers, but also includes various rubber adhesives such as synthetic isoprene rubbers, nitrile rubbers, SBR rubbers, etc. Isoprene rubbers are readily disposable because of their biodegradability.

The double-faced adhesive tape of the present invention includes a double-faced pressure-sensitive adhesive tape.

Numeral references represent the following elements: 5: double-faced adhesive tape; 11: resin film; 12: weakly adhesive layer; 13: strongly adhesive layer.

EXAMPLES

Example 1

Figure 1:
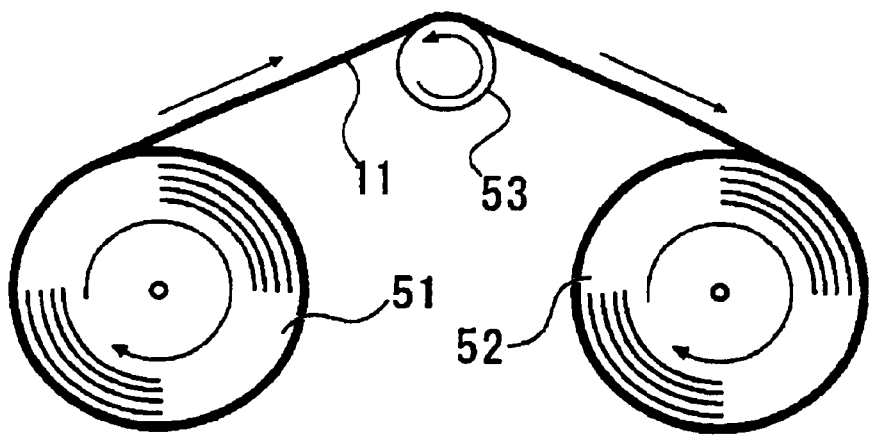
FIG. 1 is a schematic view for explaining the rubbing treatment process during the preparation of a double-faced adhesive tape according to the present invention.

Reference 51 in FIG. 1 represents a feed roll on which a polylactic resin film (a biaxially oriented film of Lacty resin available form Shimadzu Corporation) is wound as a resin film. Reference 53 represents a rubbing means comprising a rubbing material such as paper or cloths including velvet, carbon fiber, nylon, rayon or the like on the surface of a metal roller. The polylactic resin film 11 can be unwound from the feed roll 51, guided on the rubbing means 53 and taken up by a wind-up roll 52.

During the taking-up, the rubbing means 53 is rotated in the reverse direction to the polylactic resin film 11 to rub the surface of teh polylactic resin film 11 in contact with the rubbing means 53 in a dry atmosphere (normal temperature and normal pressure in the atmosphere).

Then, the polylactic resin film 11 is unwound from the wind-up roll 52, and a solution based on a polyisoprene rubber is applied with a coater on the surface of the polylactic resin film 11 having been rubbed, and dried to give a weakly adhesive layer 12 or 10 µm in thickness.

Then, a solution based on a crosslinking acrylic adhesive, (8A1018 available from Sony Chemicals Corp.) is applied on the surface of the polylactic resin film 11 not having been rubbed, and dried to give a strongly adhesive layer 13 of 30 µm in thickness, whereby a double-faced adhesive tape 5 is obtained.

Figure 4:
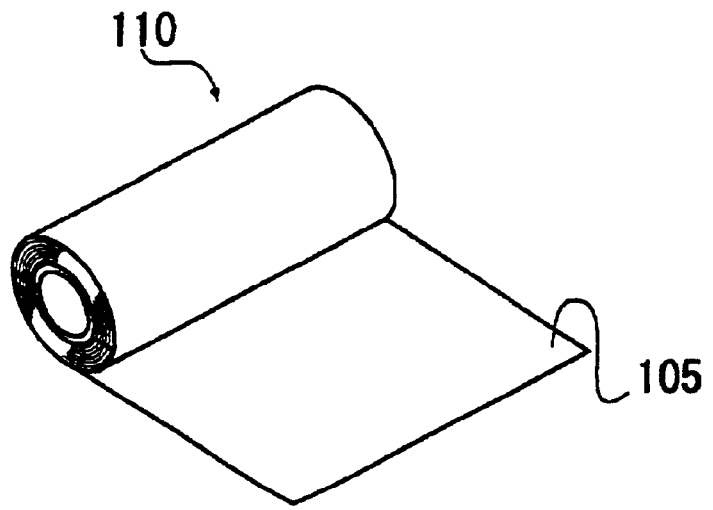
FIG. 4. is a perspective view of a roll of a double-faced adhesive tape according to the prior art.
Figure 5:
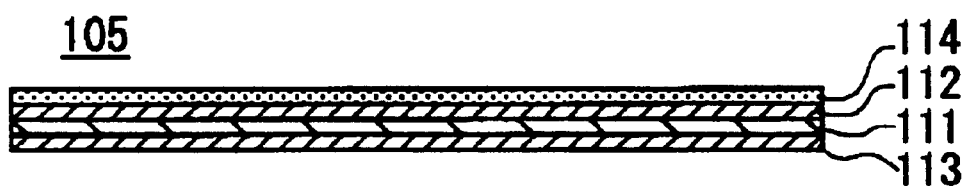
FIG. 5 is a sectional view of the double-faced adhesive tape according to the prior art.
Figure 6:
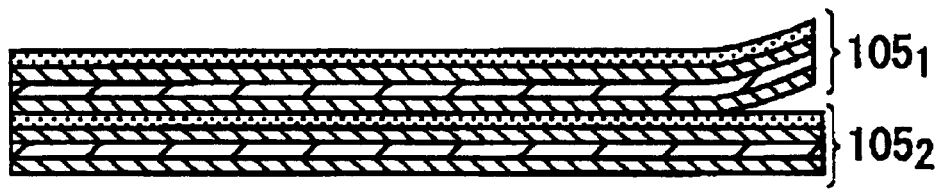
FIG. 6 is a sectional view of a stack of plies of the double-faced adhesive tape according to the prior art.

This double-faced adhesive tape 5 can directly be rolled with a coater to give a roll of the double-faced adhesive tape without release liner (having the same appearance as shown in FIG. 4). As an example, the roll has a width of 50 mm and the double-faced adhesive tape 5 has a length of about 25 to 50 m.

Example 2

Then, a similar double-faced adhesive tape to that of Example 1 was prepared except that said solution based on a crosslinking acrylic adhesive was replaced with a solution based on a crosslinking silicone adhesive (12A1080 available from Sony Chemicals, Corp.) to form a strongly adhesive layer (30 µm in thickness) on the surface having been rubbed, and rolled with a coater to prepare a roll of the double-faced adhesive tape without release liner.

Comparative Example 1

A double-faced adhesive tape roll was prepared in the same manner as in Examples 1 and 2, except that a solution based on a polyisoprene rubber was applied on the surface of a polylactic resin film not having been rubbed, and dried to form a weakly adhesive layer (10 µm in thickness).

Comparative Example 2

A solution based on a crosslinking acrylic adhesive (8A1018 available from Sony Chemicals, Corp.) was applied with a coater on both surfaces of a polylactic resin film not having been rubbed and dried to form a strongly adhesive layer of 30 µm in thickness on each of the upper and lower surfaces, thus preparing a double-faced adhesive tape soil without release liner.

Measurement Results

Figure 2A:
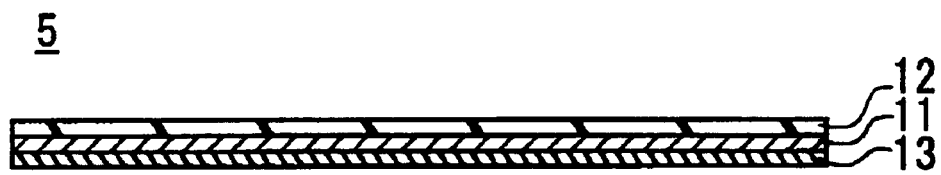
FIG. 2a shows a double-faced adhesive tape according to the present invention.
Figure 2B:
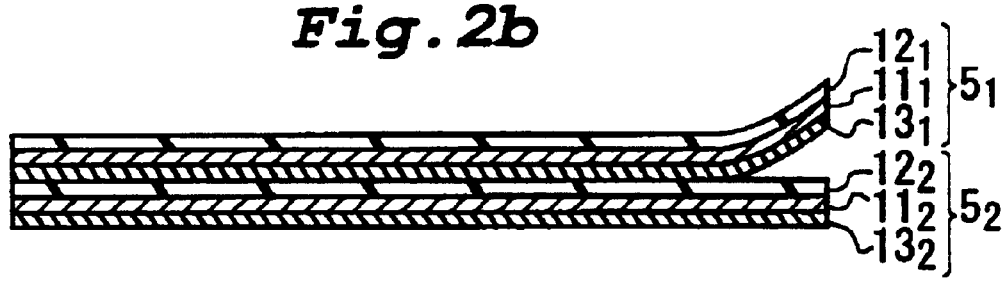
FIG. 2b shows a stack of plies of the double-faced adhesive tape.

Reference $5_1$, $5_2$ of FIG. 2b represent double-faced adhesive tapes of one double-faced adhesive tape roll. The reference $5_1$ represents the double-faced adhesive tape positioned at the outer side of the role and reference $5_2$ is positioned at the inner side of the $5_1$.

Adhesive forces between the weakly adhesive layer 12 and the polylactic resin film 11 (the weakly adhesive layer $12_1$ and the polylactic resin film $11_1$ and between the weakly adhesive layer $12_2$ and the polylactic resin film $11_2$) are strong but when they are taken up by a roll, the adhesive force between the double-faced adhesive tape 5 ($5_1$, $5_2$) is weak because the strongly adhesive layer $13_1$ of the double faced adhesive tape $5_1$ positioned at the outer side and weakly adhesive layer $12_2$ of the double-faced adhesive tape $5_2$ positioned at the inner side are in direct contact with each other.

The adhesive force A between the weakly adhesive layer 12 and the polylactic resin film 11, the adhesive force B between the weakly adhesive layer 12 and the strongly adhesive layer 13 and the adhesive force C between the strongly adhesive layer 13 and the polylactic resin film 11 are expressed by the relationship: $B<C\leq A$.

The above adhesive forces between layers (A~C) and the adhesive force between each layer and a stainless plate were measured. The results are shown in the following Table 1 (The unit of Table 1 is g/2 cm).

TABLE 1

| | Measurement results of adhesive forces | | | | |
|---|---|---|---|---|---|
| | Weekly adhesive layer Lactic polymer film | Weekly adhesive layer Stainless | Weekly adhesive layer Strongly adhesive layer | Strongly adhesive layer Stainless | Strongly adhesive layer Lactic polymer film |
| Example 1 | 1000 | 30 | 50 | 800 | 1000 |
| Example 2 | 1000 | 30 | 40 | 600 | 700 |

The weekly adhesive layers of Examples 1 and 2 are based on a polyisoprene rubber.
The strongly adhesive layer of Example 1 is based on a crosslinking acrylic pressuresensitive adhesive.
The strongly adhesive layer of Example 2 is based on a crosslinking silicone preasuresensitive adhesive.

The weakly adhesive layer 12 based on a polyisoprene rubber is formed on the surface of the polylactic resin film 11 having been rubbed to increase the adhesives force between them but the adhesive force between the weakly adhesive layer 12 and the strongly adhesive layer 13 is relatively weak. When wound adhesive tapes or adhesive tapes formed into stacks of piles are pealed off, they are separated at the interface of the weakly adhesive layer 12 and the strongly adhesive layer where they are in direct contact. Therefore, the wound adhesive tape can be easily pealed off from the roll.

On the contrary, the double-faced adhesive tape of Comparative example 1 could not be unwound from the roll but the polylactic resin film 11 and the weakly adhesive layer 12 were separated, because the surface of the polylactic resin film 11 has not been rubbed so that the adhesive force between the polylactic resin film 11 and the weakly adhesive layer 12 was relatively weak as represented by the relationship B>A.

The double-faced adhesive tape of Comparative example 2 was difficult to unwind from the roll because strongly adhesive layers adhered to each other.

The above rubbing means 53 is not limited to a cloth, but may also be a hard material. However, such a material may hurt the polylactic resin film. Therefore, it is preferable to use a soft cloth such a velvet when transparency is needed.

Although a crosslinking acrylic adhesive or a crosslinking silicone adhesive was used for the strongly adhesive layer 13 in the above examples, other adhesives may also be used to form a strongly adhesive layer. The polyisoprene rubber solution may be replaced with a nitrile rubber solution to form the weakly adhesive layer 12 on the surface of the polylactic resin film having been rubbed.

Figure 3:
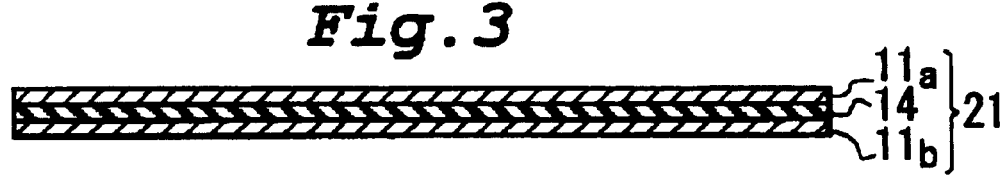
FIG. 3 shows an example or stack of plies of a resin film that can be used as a double-faced adhesive tape of the present invention.

The resin film of the present invention is not limited to a polylactic resin film with single-layer structure. As shown in FIG. 3, when an intermediate layer 14 comprising a resin other than a polylactic resin film is sandwiched in two polylactic films $11_a$, $11_b$ and the polylactic films $11_a$, $11_b$ are bonded to each other to form a resin film 21, it can be used for a double-faced adhesive tape of the present invention because, by rubbing surface of the resin film 21, its adhesive strength can be increased. The intermediate layer 14 preferably has biodegradability.

A resin film may be made of more than three polylactic resin films. In short, even if it is a resin film with multiple-layer structure, as far as the resin film has a surface whose adhesive strength can be increased by rubbing, the resin film may be used as double-faced adhesive tape of the present invention.

Moreover, the present invention is not limited to a roll of a single double-faced adhesive tape, but may also include a stack of a plurality of double-faced adhesive tapes, for example.

ADVANTAGES OF THE INVENTION

A double-faced adhesive tape without release liner is provided.

What is claimed is:

1. A double-faced adhesive tape comprising a weakly adhesive layer having a relatively weak adhesive force formed on a surface of a resin film and a strongly adhesive layer having a stronger adhesive force than that of said weakly adhesive layer formed on the opposite surface of said resin film, wherein said weakly adhesive layer is formed on the surface of said resin film having been subjected to a rubbing treatment.

2. A double-faced adhesive tape according to claim 1 wherein said resin film consists of a polylactic resin film.

3. A double-faced adhesive tape according to claim 1 wherein said weekly adhesive layer is based on a polyisoprene rubber.

4. A double-faced adhesive tape according to claim 2 wherein said weakly adhesive layer is based on a polyisoprene rubber.

5. A double-faced adhesive tape according to claim 1, which is in the form of a stack of plies with said weakly adhesive layer and said strongly adhesive layer being in direct contact with each other.

6. A double-faced adhesive tape according the claim 2, which is in the form of a stack of plies with said weakly adhesive layer and said strongly adhesive layer being in direct contact with each other.

7. A double-faced adhesive tape according to claim 3, which is in the form of a stack of plies with said weakly adhesive layer and said strongly adhesive layer being in direct contact with each other.

8. A double-faced adhesive tape according to claim 4, which is in the form of a stack of plies with said weakly adhesive layer and said strongly adhesive layer being in direct contact with each other.

9. A double-faced adhesive tape according to claim 5, which is in the form of a roll.

10. A double-faced adhesive tape according to claim 6, which is in the form of a roll.

11. A double-faced adhesive tape according to claim 7, which is in the form of a roll.

12. A double-faced adhesive tape according to claim 8, which is in the form of a roll.

* * * * *